(12) United States Patent
Khan et al.

(10) Patent No.: US 7,553,079 B1
(45) Date of Patent: Jun. 30, 2009

(54) TEMPERATURE SENSOR ASSEMBLY

(75) Inventors: Ekramul H. Khan, Rochester Hills, MI (US); Pablo Valencia, Jr., Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/015,707

(22) Filed: Jan. 17, 2008

(51) Int. Cl.
*G01K 1/00* (2006.01)
*G01K 1/14* (2006.01)
*G01K 13/00* (2006.01)
*G01P 1/02* (2006.01)

(52) U.S. Cl. .................. 374/208; 374/148; 374/163; 73/866.5

(58) Field of Classification Search ............... 374/147, 374/148, 116, 208
See application file for complete search history.

(56) References Cited

U.S. PATENT DOCUMENTS

| | | | |
|---|---|---|---|
| 5,733,044 A * | 3/1998 | Rose et al. ............. | 374/144 |
| 7,056,013 B2 * | 6/2006 | Anderson et al. ........ | 374/138 |
| 7,237,948 B2 * | 7/2007 | Nakabayashi ........... | 374/148 |

* cited by examiner

*Primary Examiner*—Lisa M Caputo
*Assistant Examiner*—Mirellys Jagan

(57) ABSTRACT

A sensor assembly for installation in a hole formed in a wall of a duct, includes a sensor, and a body containing the sensor and extending along an axis, the body including a shoulder, and a series of elastically resilient ribs spaced mutually along the axis and inclined outward and toward the shoulder, the ribs undergoing flexural displacement into engagement with the wall as the assembly is inserted into the hole.

15 Claims, 2 Drawing Sheets

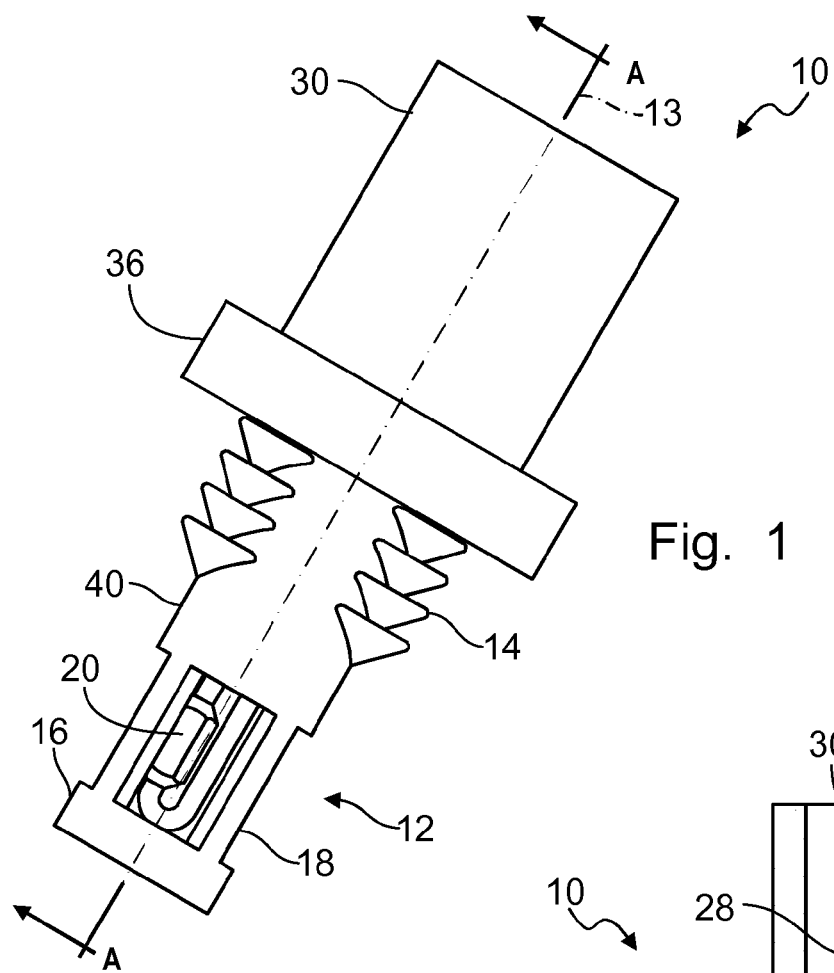
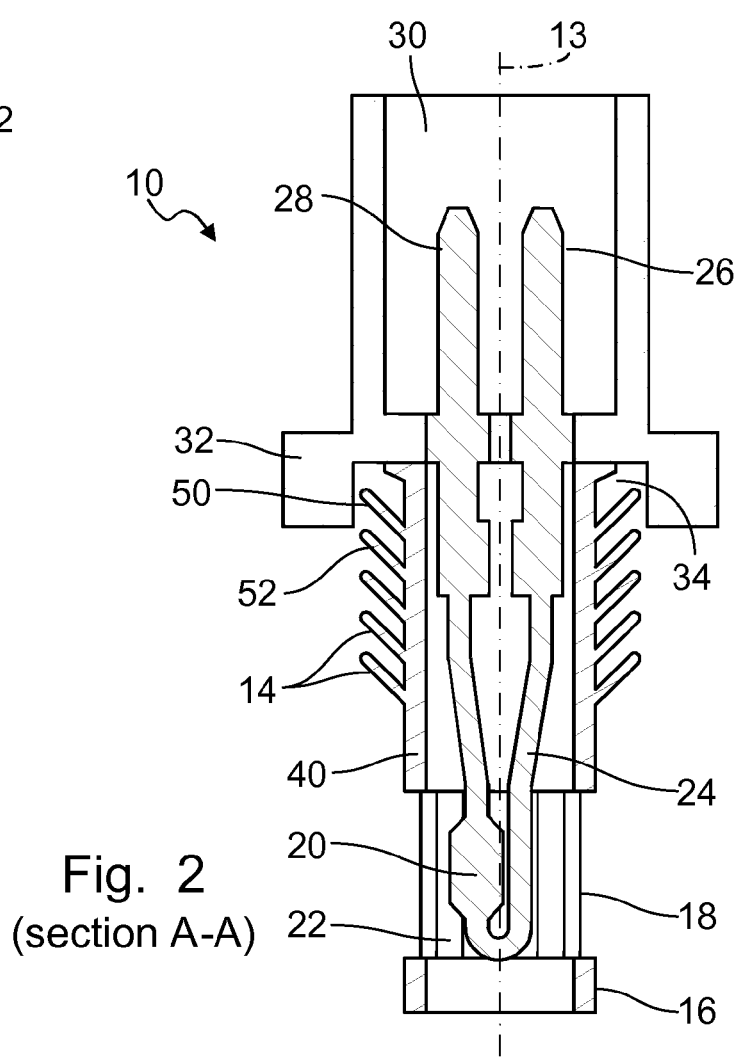

(section B-B)

TEMPERATURE SENSOR ASSEMBLY

BACKGROUND OF INVENTION

The present invention relates generally to heating ventilation and air conditioning (HVAC) systems, and, more particularly to an air temperature sensor for an automatically controlled HVAC system.

Automatic control of HVAC systems requires that the correct temperature of air flowing through the air ducts and outlets be determined. An electronic sensor, installed in an air duct, produces a signal representing the temperature of air flowing in an air duct. The sensor includes a NTC thermistor and two leads coated with epoxy, housed in a plastic body.

It is conventional to form HVAC air ducts by a blow molding process that causes the thickness of the duct walls to vary from 0.70 mm. to 2.25 mm. A conventional sensor assembly includes a plastic retainer having two ribs spaced about 1.5 mm. apart, which ribs engage the duct wall when the sensor assembly is inserted into the duct. A temperature probe portion of the assembly is inserted in the retainer and held in position on the duct wall. Terminals of the sensor assembly are then connected by a wiring harness to an electronic HVAC control module.

The retainer's ribs cannot accommodate or compensate for variations in the thickness of the duct, if the duct wall thickness varies much from 1.5 mm. Additionally, the temperature sensor is sensitive to variations in the diameter of the hole formed in the duct wall where the sensor is located. Consequently a sensor, poorly fitted in the duct wall, can lose its retention on the duct wall, disengage and become lost at a vehicle assembly plant.

SUMMARY OF INVENTION

An embodiment contemplates a sensor assembly for installation in a hole formed in a wall of a duct. The assembly includes a sensor, and a body containing the sensor and extending along an axis, the body including a shoulder, and series of elastically resilient ribs spaced mutually along the axis and inclined outward and toward the shoulder, the ribs deflecting flexurally into engagement with the wall as the assembly is inserted into the hole. The sensor is preferably a temperature sensor, and the duct is an air duct having a relatively thin wall thickness.

An advantage of an embodiment is its one-piece design and tree type fastening scheme, which is highly tolerant of variations in duct thickness and hole size. The sensor probe is aligned with and inserted into a hole in the duct. The sensor probe is retained in the hole by elastic deformation of plastic serrations formed on the outer surface of the sensor.

The sensor assembly is of a compact size and unitary construction that incorporates the sensor and retainer in a single part that is easily and speedily installed in an air duct. Retention of the sensor assembly in the thickness of the duct wall is exceptionally reliable. The assembly is engaged with the inner and outer surfaces of the duct wall with a tight fit that prevents inadvertent displacement of the assembly relative to the duct.

The shape, size and elastically resilient character of the ribs facilitates insertion of the assembly in a hole through the duct wall. After installation, the ribs resist, but do not prevent removal, of the assembly from the duct.

BRIEF DESCRIPTION OF DRAWINGS

FIG. 1 is a side view of an electronic duct air temperature sensor assembly;

FIG. 2 is a cross sectional view of the sensor assembly of FIG. 1;

DETAILED DESCRIPTION

Figure 3:
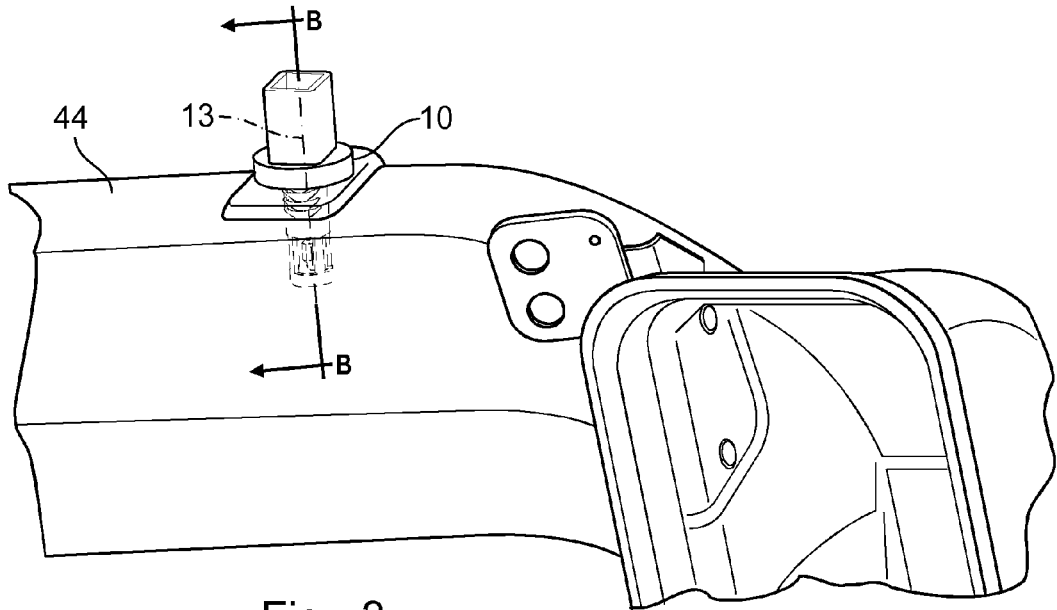
FIG. 3 is a perspective view showing the sensor assembly installed in an air duct.

FIGS. 1 and 2 illustrate an electronic duct air temperature sensor assembly 10 that includes a body 12 having a central axis 13 and formed with a series of ribs 14 spaced along the body, a cylindrical base 16 and a cage 18 containing an air temperature sensor 20. The cage 18 includes open passages 22 that allow air in the duct to flow through the assembly 10 and across the sensor 20.

Electric conducting leads 24 extend from sensor 20 along the body 12 to terminals 26, 28, which are enclosed in a receptacle portion 30 of the body 12, into which receptacle is inserted a plug secured to a wiring harness (not shown) for electrically engaging the terminals. The body 12 includes a cylindrical shoulder 32, which is formed with an annular recess 34.

FIG. 2 shows that the ribs 14 extend radially outward and upward toward the shoulder 32. The ribs 14 are relatively thin, flexible, elastically displaceable and resilient, i.e., they tend to return to the position shown in FIG. 2 after being deflected due to flexure upon installation in a duct. Preferably the body 12 including ribs 14 are formed of elastically resilient plastic.

The size and shape of the cylindrical base 16 extend above the cage to a cylindrical portion 40 of the body 12, on which the ribs are supported and from which the ribs extend radially outward and upward toward the shoulder 36.

Figure 4:
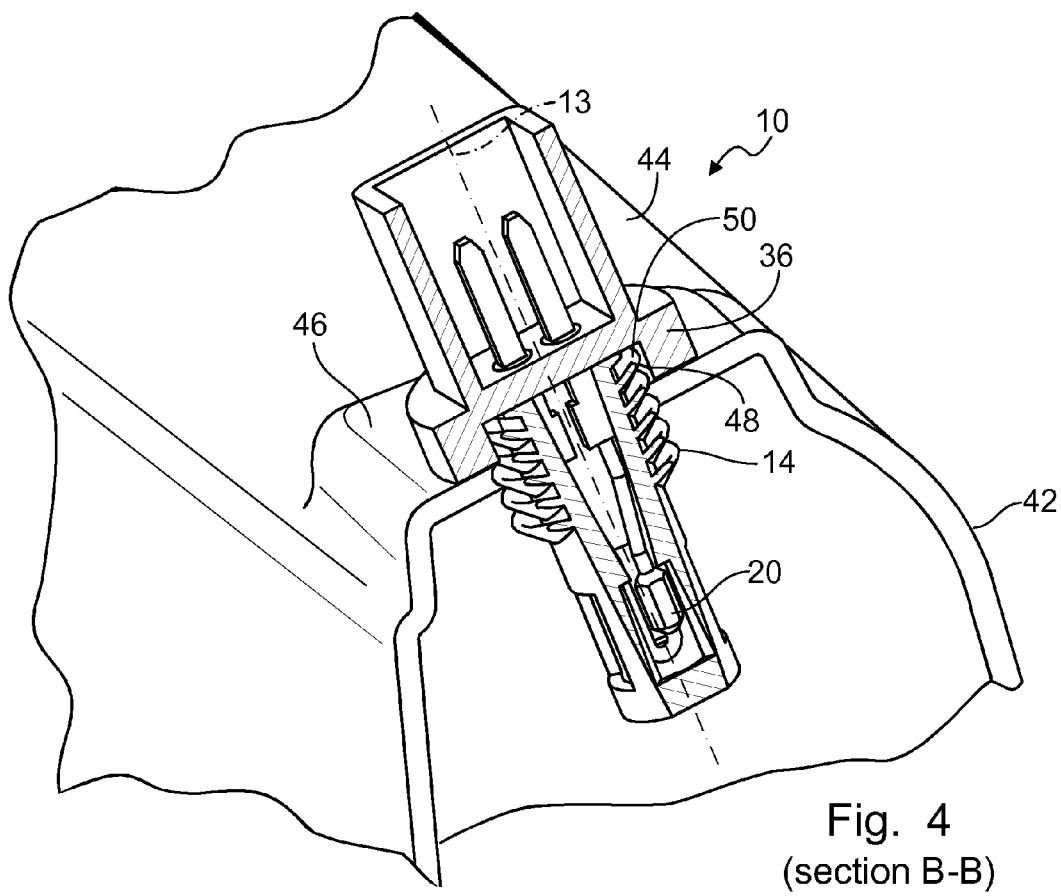
FIG. 4 is a cross sectional view showing the sensor assembly installed in an air duct.

FIGS. 3 and 4 show the sensor assembly 10 installed in the wall 42 of an air duct 44. As FIG. 4 illustrates, the duct preferably includes a mounting surface 46, which is raised above the surface of the surrounding duct 44 and is formed with a hole 48, whose size allows the base 16, ribs 14, and cylindrical portion 40 to enter, yet prevents the shoulder 36 from entering.

Before the sensor assembly 10 is inserted into the hole 48, a rubber gasket may be seated on the mounting surface below the shoulder 32.

As FIG. 2 illustrates, at least one rib, preferably the uppermost rib 50, extends into the annular recess 34 formed in shoulder 32. When the assembly 10 is inserted into the hole 48 and the assembly is installed in the duct wall 42, rib 50 elastically flexes into contact with the outer surface of the mounting surface 46, and the next rib 52 located immediately below rib 50 flexes into contact with the inner surface of the mounting surface, as shown in FIG. 4.

The inclination of the ribs facilitates inserting the sensor assembly 10 into the hole 48 and resists removal of the assembly from the hole. The ribs elastically deflect in flexure as they enter the hole 48. This flexural deflection permits the ribs to engage the inner and outer surfaces of mounting surface 46 around the entire periphery of the hole 48. The engagement secures the assembly 10 to the wall 42 and resisting its removal. When the assembly 10 is properly installed, shoulder 32 seats on the mounting surface 46 or on a thin rubber gasket located on the mounting surface.

While certain embodiments of the present invention have been described in detail, those familiar with the art to which this invention relates will recognize various alternative designs and embodiments for practicing the invention as defined by the following claims.

What is claimed is:

1. A sensor assembly for installation in a hole formed in a wall of a duct, comprising:
   a sensor; and
   a body containing the sensor and extending along an axis, the body including a shoulder formed with a recess, and a series of elastically resilient ribs spaced mutually along the axis and inclined away from the axis and toward the recess, one of the ribs extending into the recess, at least one of the ribs deflecting flexurally into engagement with the wall as the assembly is inserted into the hole.

2. The sensor assembly of claim 1 further comprising:
   terminals electrically coupled to the sensor and extending away from the shoulder; and
   a receptacle surrounding the terminals and formed with an opening that provides access to the terminals from outside the duct.

3. The sensor assembly of claim 1 wherein the body further comprises:
   a base arranged symmetrically about the axis; and
   a cylindrical portion spaced along the axis from the base.

4. The sensor assembly of claim 1 wherein the body further comprises:
   a base arranged symmetrically about the axis;
   a cylindrical portion spaced along the axis from the base and extending toward the shoulder; and
   a cage containing the sensor, the cage having an opening that permits fluid in the duct to flow over the sensor.

5. A sensor assembly for installation in a hole formed in a wall of a duct that carries a pneumatic fluid, comprising:
   a sensor; and
   a body containing the sensor and extending along an axis, including a series of elastically resilient ribs spaced mutually along the axis and inclined outward from the axis and along the axis, at least one of the ribs deflecting flexurally into engagement with the wall as the assembly is inserted into the hole, and a shoulder formed with an annular recess facing an outer surface of the wall when the assembly is installed in the duct, the recess being located relative to the ribs such that at least one of the ribs extends into the recess.

6. The sensor assembly of claim 5, wherein the ribs are inclined along the axis is a direction opposite a direction that the assembly is inserted into the hole to install the assembly in the duct.

7. The sensor assembly of claim 5 further comprising:
   terminals electrically coupled to the sensor and extending away from the sensor; and
   a receptacle surrounding the terminals and formed with an opening that provides access to the terminals from outside the duct.

8. The sensor assembly of claim 5 wherein the body further comprises:
   a base arranged symmetrically about the axis; and
   a cylindrical portion spaced along the axis from the base, the ribs being supported on the cylindrical portion.

9. The sensor assembly of claim 5 wherein the body further comprises:
   a base arranged symmetrically about the axis;
   a cylindrical portion spaced along the axis from the base and extending toward the shoulder; and
   a cage containing the sensor, the cage having an opening that permits fluid in the duct to flow over the sensor.

10. A sensor assembly for installation in a hole formed in a wall of a duct, comprising:
    a temperature sensor; and
    a body containing the temperature sensor and extending along an axis, the body formed with a recess and including a first elastically resilient rib, and a second elastically resilient rib spaced along the axis from the first rib and extending into the recess, said ribs being inclined away from the axis and toward the recess and deflecting flexurally into engagement with the wall as the assembly is inserted into the hole.

11. The sensor assembly of claim 10, wherein the ribs are inclined along the axis is a direction opposite a direction that the assembly is inserted into the hole to install the assembly in the duct.

12. The sensor assembly of claim 10 further comprising:
    terminals electrically coupled to the temperature sensor and extending away from the temperature sensor; and
    a receptacle surrounding the terminals and formed with an opening that provides access to the terminals from outside the duct.

13. The sensor assembly of claim 10 further including a shoulder formed with the annular recess and facing an outer surface of the wall when the assembly is installed in the duct.

14. The sensor assembly of claim 10 wherein the body further comprises:
    a base arranged symmetrically about the axis; and
    a cylindrical portion spaced along the axis from the base, said ribs being supported on the cylindrical portion.

15. The sensor assembly of claim 10 wherein the body further comprises:
    a base arranged symmetrically about the axis;
    a cylindrical portion spaced along the axis from the base and extending toward a shoulder; and
    a cage containing the temperature sensor, the cage having an opening that permits fluid in the duct to flow over the temperature sensor.

* * * * *